United States Patent Office 3,259,593
Patented July 5, 1966

3,259,593
SELF-EXTINGUISHING URETHANE POLYMER COMPOSITIONS
Jacob Eichhorn, Midland, Mich., assignor to The Dow Chemical Company, Midland, Mich., a corporation of Delaware
No Drawing. Filed May 31, 1960, Ser. No. 32,620
The portion of the term of the patent subsequent to Dec. 22, 1981, has been dedicated to the Public
30 Claims. (Cl. 260—2.5)

This invention relates to urethane polymer compositions. More particularly, it relates to self-extinguishing polyurethane compositions and cellular structures made from such compositions. This invention also pertains to compositions suitable for rendering materials self-extinguishing.

Polyurethanes are polymers containing repeated

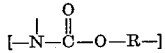

urethane linkages. These polymers are made by reacting a polyisocyanate with a compound having a plurality of active hydrogens. By compound having active hydrogen is meant a compound that gives a positive Zerewitinoff test. Polyurethane resins can be made into foams having excellent strength, durability, low density, light color, uniform cell size and good heat insulating properties, and can be used for many purposes. Unfortunately, these foams burn readily when ignited, that is, they support combustion thus making them unsuitable for certain uses in which fire is a hazard. Accordingly, it is desirable to make polyurethane resin foams which are self-extinguishing so as to eliminate or minimize the hazard of fire. By "self-extinguishing" it is meant that the material is incapable of burning or sustaining a flame for more than a short time after it is separated from an open flame in which it has been heated and ignited. In other words, a composition is considered to be self-extinguishing if its stops burning shortly after a flame used to start its burning has been removed or the material is taken out of the flame.

Certain organic bromine compounds particularly organic bromine compounds containing two or more bromine atoms attached to carbon atoms of an aliphatic or cycloaliphatic radical have a tendency to render foams with which they are admixed self-extinguishing by reducing the time that such foams continues to burn after having been separated from a flame causing their ignition. However, these organic bromides produce disadvantageous effects in foams in which they are incorporated, such as impairment of tensile strength, original appearance, light stability, and other properties of the foams, when used as the sole agent and in sufficient quantity to render foams self-extinguishing. In addition, these bromine compounds increase the cost of foams made with them when the bromine compounds are used in such amounts as to impart self-extinguishing properties thereto.

It is among the objects of the present invention to provide urethane polymer compositions having improved self-extinguishing properties.

A further object of the present invention is to provide self-extinguishing polyurethane resin foam compositions.

A still further object of this invention is the provision of self-extinguishing polyurethane foams of good strength and appearance in an economical manner.

Still another object of this invention is the provision of a composition of matter useful for rendering materials self-extinguishing.

These and other objects are accomplished in accordance with the following detailed description of this invention.

It has now been discovered that certain antimony compounds in combination with certain organic bromides act synergistically to render urethane polymers self-extinguishing when admixed therewith.

In accordance with the invention it has been found that the above objects are accomplished and self-extinguishing urethane polymers are provided when both certain organic bromides and certain antimony compounds are present in an intimate mixture in urethane polymer material. The synergistic effect of the organic bromides and the antimony compounds in combination, uniformly dispersed throughout the polymeric material is such that a given total amount of a combination of these synergists imparts substantially greater self-extinguishing properties to urethane polymers than does the same amount of either of these materials used alone. In situations in which a quantity of one of the materials used alone produces some self-extinguishing effect on urethane polymers, a lesser quantity of the new combination of organic bromide with antimony compound will produce the same or an improved effect.

In accordance with the invention, the materials that act synergistically with the organic bromides are certain antimony compounds namely, antimonous chloride, antimonous bromide, antimonous iodide, antimonous oxychloride and antimonous sulfide.

The organic bromides which can be employed according to the invention are organic bromides containing a plurality of bromine atoms in an aliphatic or a cycloaliphatic radical, these bromine atoms constituting at least 45 percent by weight of the molecule. The bromine atoms are preferably attached to adjacent or vicinal carbon atoms in an aliphatic or a cycloaliphatic radical, e.g., the cyclohexyl radical. The organic bromides can be formed by addition of bromine to an olefinic linkage or by the addition of bromine to the unsaturation of benzene, or by substitution of bromine for hydrogen, e.g., by the bromination of aliphatic organic compounds. Examples of suitable organic bromides are methyl 2,3-dibromopropionate, tris(2,3-dibromopropyl) phosphate, carbon tetrabromide, tetrabromoethylene, 1,2-dibromo-1,1,2,2 - tetrachloroethane, 1,1,2,2 - tetrabromoethane, dibromodichloromethane, 1,2 - dibromo - 1,1 - dichloroethane, 1,2 - dibromo - 1,2,2 - trichloroethane, 1,2,3,4-tetrabromobutane, pentabromobutane, 1,2,3 - tribromopropane, 1,2,4 - tribromobutane, tetrabromopentanes, pentabromoethane, hexabromoethane, dibromosuccinic acid, 1,2 - di(dibromomethyl)benzene, alpha-beta-dibromoethylbenzene, 1,2,3,4,5,6 - hexabromocyclohexane, 1,2,3,4,5 - pentabromo - 6 - chlorocyclohexane, tetrabromodichlorocyclohexanes and tribromotrichlorocyclohexanes. The bromochlorocyclohexane compounds can be prepared by reaction of chlorine and bromine with benzene under the influence of actinic radiation, e.g., ultraviolet light or sunlight, employing a procedure similar to that described in bull. Soc. Chem. (France), pages 118–121 (1949).

As indicated above, polyurethane resins can be made by reacting a polyisocyanate with a compound having a plurality of active hydrogens. Representative examples of polyisocyanates that can be used to make the resin are 2,4-tolylene diisocyanate, 2,6-tolylene diisocyanate, the phenylene diisocyanates, the naphthalene diisocyanates, 1,2,4-benzene triisocyanate, hexamethylene diisocyanate, trimethylene diisocyanate, ethylene diisocyanate, 1,4-cyclohexylene diisocyanate, 1,3-cyclopentylene diisocyanate and mixtures thereof. Arylene diisocyanates, that is, those in which each of the two isocyanate groups is attached directly to an aromatic ring, are preferred. The compound mentioned above having a plurality of active hydrogens can be a polyhydroxy compound such as glycols, triols, hexols, octols, polyesterpolyols and polyetherpolyols. A polyesterpolyol can be made by reacting a polybasic acid with an excess of a polyhydric alcohol. If a linear polyesterpolyol is desired, difunctional reactants can conveniently be used, such as phthalic acid or its anhydride with ethylene glycol. A polyetherpolyol can be made by condensing a polyhydroxy compound such as ethylene glycol, glycerol and sucrose with an alkylene oxide such as ethylene oxide, propylene oxide, and 1,2-butylene oxide. Using a mixture of polypropylene oxide-glycerol adducts of the formula:

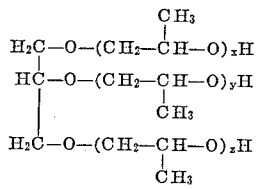

produces a rigid polymer when the sum of $x$, $y$, and $z$ is about 6 and a flexible polymer when the sum of $x$, $y$, and $z$ is about 15 or higher. Relatively low molecular weight alkylene oxide-sucrose condensates produce rigid polymers when polymerized with polyisocyanates. Polymers of varying rigidity and flexibility can be tailored by selecting a condensate or a mixture of condensates of suitable molecular weight and structure to be reacted with the polyisocyanate. Other hydroxyl-rich compounds such as a condensate of ethylenediamine with propylene oxide can be used to produce useful polyurethanes. By still another approach, polyurethanes can be made by reacting a bischloroformate with a polyamine. In all instances the resulting polymers contain multiple urethane linkages.

Polyurethane resins can be made in cellular form by adding water or a carboxyl group-containing compound to a reaction mixture containing polyisocyanates, whereby carbon dioxide is liberated which causes the liquid reaction mixture to expand and foam. Alternatively, a polyurethane foam may be made by admixing a volatile liquid with one of the reactants, namely, the polyisocyanate or the compound containing a plurality of active hydrogens, before they are mixed. The volatile liquid and the reactants can all be brought together simultaneously or the volatile liquid can be mixed with the reactants shortly after they are brought together. The volatile liquid is converted to a gas when the reactants are combined due to the heat of the reaction or by external heating thereby producing small gas bubbles in the reacting liquid. Representative examples of suitable volatile liquids which can be used for this purpose are trichloromonofluoromethane, hexane, methylchloroform, symmetrical tetrachlorodifluoroethane, and trichlorotrifluoroethane.

A catalyst for the reaction between the isocyanate radical and active hydrogen can be used when making urethane polymers and is usually desirable when a product of cellular form is to be made. Representative examples of suitable catalysts are, triethylenediamine, dibutyltin dilaurate, triethylamine, N,N-dimethylcyclohexylamine, cobalt naphthenate and stannous octoate.

If desired, a cell size control agent can be added to the reaction mixture. Materials such as copolymers of polyethylene glycol and dimethylsiloxane serve to produce cells of smaller size in polyurethane foams. These materials can be made as described in British Patent No. 793,501. Representative examples of other cell size control agents are sodium dioctyl sulfosuccinate and zinc stearate.

The organic bromides are employed in amounts corresponding to from 2 to 30 percent, preferably from 5 to 20 percent, together with the antimony compounds in amounts of from 1 to 15 percent, preferably from 2 to 10 percent. The percentages are based on the weight of the polymer, including the blowing agent when a blowing agent is used.

Self-extinguishing urethane polymer compositions are obtained by employing both the organic bromides and the antimony compounds in proportions within these ranges.

The organic bromide and the antimony compounds can be incorporated in the resin by any method which gives uniform distribution of the agents throughout the body of the resin and which does not cause or result in appreciable deterioration or decomposition of either of said agents or the resin.

The organic bromide and the antimony compounds can be premixed and then added to the isocyanate material or to the active hydrogen containing material before the said materials are brought together to form the polymer. Alternatively, the synergists of this invention can be premixed and then blended with the polymer forming reactants as they are brought together or shortly after they are combined and before the reaction has proceeded to a point where uniform dispersion of the synergists with the polymer is no longer practicable. If desired, the synergistic agents of this invention may be added one at a time to the polymer forming constituents. To illustrate, one of the agent can be added to the isocyanate material, to the active hydrogen containing material, to a mixture of these materials as they are brought together or shortly thereafter and before the reaction of the polymer forming constituents has proceeded to a point where uniform dispersion of the addtive in the polymer is no longer practicable, or at two or more of these places. The other agent can be added at one or more of the above places which may be the same or different from where the first agent is added.

When using the synergistic agents of this invention in premixed form, the premixture preferably contains from 5 to 20 parts by weight of organic bromide as above defined, and from 2 to 10 parts by weight of synergistic antimony compound. A composition containing about 10 parts by weight of organic bromide and about 5 parts by weight of antimony compound is found especially suitable for purposes of this invention.

The formulations of this invention can be made by batch methods employing either hand mixing or simple stirring equipment. Several types of mechanical equipment are available which can automatically meter the constituents to a mixer and dispense foams in predetermined quantities. This equipment can be run either continuously or intermittently.

Self-extinguishing polymer compositions of this invention can be made into useful articles by conventional molding, casting, coating and laminating techniques. Foams of these compositions can be cast onto a conveyor belt to produce sheets or slabs of self-extinguishing polyurethane foams which may then be cut up into convenient sizes. The self-extinguishing foams made from the compositions of this invention can be cast in molds to make desired shapes or the foams can be cast in place to fill voids in a final article as in the potting of electrical equipment and the strengthening of double walled members.

The following examples, in which parts and percentages are by weight unless otherwise indicated, are illustrative of the present invention but the invention is not limited thereto.

EXAMPLE I

There are dissolved in 33.6 parts of a polyol [having a hydroxyl content of about 17.3 percent (determined by acetylation) and a viscosity of 200 stokes at 24° C. formed by reacting a mixture of equal parts of glycerine and sucrose with propylene oxide] ¼ part of triethylenediamine and ¼ part of dibutyltin dilaurate. Into this solution there is then admixed ¼ part of a copolymer of polyethylene glycol and dimethylsiloxane, the copolymer having an average molecular weight of 2,500 and made as described in British Patent No. 793,501. The mixture is stirred and cooled to 50° F. To this cooled mixture is then added with stirring 12.4 parts of trichlorofluoromethane as a blowing agent. The above composition is rapidly admixed in a container with 53.25 parts of an adduct of a polyol and an excess of a mixture of tolylene diisocyanates, there being 80 percent of the 2,4-isomer and 20 percent of the 2,6-isomer in the diisocyanate mixture. The polyol has an average molecular weight of 4,000 and is made by condensing propylene oxide with glycerine. The excess of the tolylene diisocyanate is such that the —NCO content of the adduct is about 30 percent. The polyol-tolylene diisocyanate adduct has a viscosity of 105 stokes at 24° C. Based on the weight of the above total mixture there is then added 20 parts per hundred of tris-(2,3-dibromopropyl) phosphate and 2 parts per hundred of finely divided antimonous chloride. Stirring is again employed to assure uniform distribution of all constituents. The mass begins to foam and is discharged into a mold. When the foam has gelled it is placed in a curing oven at 70° C. After 15 minutes the foam is removed from the oven and allowed to cool to room temperature. The cellular mass is a white, rigid, fine-celled foam.

A test strip is cut from the foamed product and tested for flammability. The strip is in the shape of a rectangular prism three inches long, ¾ inch wide, and 3/16 inch thick. The strip is placed in the flame of a microburner and after approximately four seconds, it is removed. Upon removal from the microburner flame, the strip is itself aflame, and continues to burn for 1 second from the time it is removed from the microburner flame. After the 1 second has elapsed, the flame on the foamed polymer strip goes out, that is, the material no longer sustains a flame, and is said to have a self-extinguishing time of 1 second.

By contrast, foam strips are made and tested in the manner described in Example 1 using the same constituents but omitting the antimonous chloride and varying the amount of tris(2,3-dibromopropyl) phosphate used. The results of the tests are shown in Table I.

Table I

| Tris (2,3-dibromopropyl) phosphate (pph.)[1] | Self-Extinguishing Time (seconds) |
| --- | --- |
| 15 | Burns completely. |
| 20 | 15. |
| 25 | 5. |

[1] Parts per hundred.

EXAMPLES II THROUGH V

Foam strips are made and tested as in Example I except that 2 parts of one of the four antimony compounds listed below, in finely divided form, is substituted for the antimonous chloride of Example I. The results obtained appear in Table II.

Table II

| Example | Antimony Compound | S.E.[1] Time (seconds) |
| --- | --- | --- |
| II | SbBr$_3$ | 2 |
| III | SbI$_3$ | 3½ |
| IV | SbOCl | 1½ |
| V | Sb$_2$S$_3$ | 4 |

[1] Abbreviation for "Self-Extinguishing."

EXAMPLES VI THROUGH IX

Foam strips are made and tested as in Example I except that 10 parts of the organic bromide are used together with 5 parts in finely divided form, of one of the four antimony compounds listed in Table III along with the test results.

Table III

| Example | Antimony compound | S.E. Time (seconds) |
| --- | --- | --- |
| VI | SbCl$_3$ | 5 |
| VII | SbBr$_3$ | 6 |
| VIII | SbI$_3$ | 9 |
| IX | SbOCl | 8 |

By contrast foam strips are made and tested as in Examples VI through IX except that 5 parts of one of each of the following compounds is substituted for the antimony compounds above identified: Sb$_2$O$_5$, Sb$_2$(SO$_4$)$_3$, and KSbO$_3$. None of these products is self-extinguishing; they all burn completely.

EXAMPLES X THROUGH XII

Foam strips are made and tested as in Example I except that 10 parts, in finely divided form, of antimonous chloride are used and 5 parts of one of each of the organic bromides listed below is substituted for the organic bromide used in Example I. The results obtained appear in Table IV.

Table IV

| Example | Organic Bromide | S.E. Time (seconds) |
| --- | --- | --- |
| X | 1,2,3,4,5-pentabromo-6-chlorocyclohexane | 1½ |
| XI | Acetylene tetrabromide | 2 |
| XII | 1,2,3,4-tetrabromobutane | 1½ |

By contrast foam strips are made and tested as in Examples X through XII except that the antimony compound is omitted entirely and 15 parts of one of each of the organic bromine compounds listed in Table IV is used. None of these products is self-extinguishing; they all burn completely.

EXAMPLES XIII THROUGH XV

Foam strips are made and tested as in Example I except that only 5 parts of antimonous chloride are used and 10 parts of one of each of the organic bromine compounds listed below is substituted for the organic bromide used in Example I. The results obtained appear in Table V.

Table V

| Example | Organic Bromide | S.E. Time (seconds) |
| --- | --- | --- |
| XIII | Acetylene tetrabromide | 1 |
| XIV | 1,2,3,4,5-pentabromo-6-chlorocyclohexane | 1½ |
| XV | 1,2,3,4-tetrabromobutane | 1 |

EXAMPLES XVI THROUGH XVIII

Foam strips are made and tested as in Examples XIII through XV except that 5 parts of antimony oxychloride is substituted for the antimonous chloride used therein. The results obtained are shown in Table VI.

Table VI

| Example | Organic Bromide | S.E. Time (seconds) |
| --- | --- | --- |
| XVI | Acetylene tetrabromide | 1 |
| XVII | 1,2,3,4,5-pentabromo-6-chlorocyclohexane | 2 |
| XVIII | 1,2,3,4-tetrabromobutane | 2 |

It has been found that mixtures of the organic bromides of this invention with SbCl$_3$, SbBr$_3$, SbI$_3$, SbOCl, and Sb$_2$S$_3$ are stable. As indicated above, the synergistic combinations of the bromine compounds and antimony compounds of this invention can be pre-mixed and then used to render the products self-extinguishing.

In using the mixtures of this invention one or more of the organic bromine compounds can be used with one or more of the antimony compounds. When smaller amounts of the synergistic mixtures are used than indicated in the examples the self-extinguishing time is greater than indicated in the examples; when greater amounts are used the self-extinguishing time becomes less. While greater amounts of the synergistic mixtures than necessary to produce self-extinguishing times of less than one or two seconds can be used without harmful effect, the use of such amounts is presently considered uneconomic. It will be understood, that in the practice of the invention, various other additives may be incorpo- That which is claimed is:

1. A composition of matter comprising a polyurethane resin obtainable by reacting a polyisocyanate and a compound containing active hydrogen as determined by the Zerewitinoff test containing intimately admixed therewith, as the sole self-extinguishing composition, a synergistic composition consisting of from 2 to 30 percent based on the weight of the resin of an organic bromine compound having a plurality of bromine atoms attached to the carbon atoms of a radical selected from the group consisting of cyclohexyl and aliphatic radicals, the bromine atoms constituting at least 45 percent by weight of the compound, and from 1 to 15 percent based on the weight of the resin of an antimony compound selected from the group consisting of $SbCl_3$, $SbBr_3$, $SbI_3$, $SbOCl$, $Sb_2S_3$ and mixtures thereof.

2. A composition according to claim 1 in which the organic bromine compound is tris(2,3-dibromopropyl) phosphate.

3. A composition according to claim 1 in which the organic bromine compound is 1,2,3,4-tetrabromobutane.

4. A composition according to claim 1 in which the organic bromine compound is acetylene tetrabromide.

5. A composition according to claim 1 in which the antimony compound is $SbCl_3$.

6. A composition according to claim 1 in which the antimony compound is $SbBr_3$.

7. A composition according to claim 1 in which the antimony compound is $SbOCl$.

8. A self-extingushing foam comprising a normally flammable polyurethane resin obtainable by reacting a polyisocyanate and a compound containing active hydrogen as determined by the Zerewitinoff test in intimate admixture with, as the sole self-extinguishing composition, a synergistic composition consisting of from 1 to 15 percent based on the weight of the resin of an antimony compound selected from the group consisting of $SbCl_3$, $SbBr_3$, $SbI_3$, $SbOCl$, $Sb_2S_3$, and mixtures thereof, and from 2 to 30 percent based on the weight of the resin of an organic bromine compound having a plurality of bromine atoms attached to carbon atoms of a radical selected from the group consisting of the cyclohexyl and aliphatic radicals, the bromine atoms consisting of at least 45 percent by weight of the organic compound.

9. A self-extingushing foam according to claim 8 in which the organic bromine compound is tri(2,3-dibromopropyl)phosphate.

10. A self-extinguishing foam according to claim 8 in which the organic bromine compound is 1,2,3,4-tetrabromobutane.

11. A self-extinguishing foam according to claim 8 in which the organic bromine compound is acetylene tetrabromide.

12. A self-extinguishing foam according to claim 8 in which the antimony compound is $SbCl_3$.

13. A self-extinguishing foam according to claim 8 in which the antimony compound is $SbBr_3$.

14. A self-extinguishing foam according to claim 8 in which the antimony compound is $SbOCl$.

15. A self-extinguishing rigid resin foam comprising a normally flammable polyurethane resin obtainable by reacting a polyisocyanate and a compound containing active hydrogen as determined by the Zerewitinoff test, and, uniformly distributed throughout the resin and based on the weight of the polyurethane resin and entrapped gas, as the sole self-extinguishing composition, a synergistic composition consisting of from 5 percent to 20 percent of an organic bromine compound having a plurality of bromine atoms attached to carbon atoms of a radical selected from the group consisting of the cyclohexyl and aliphatic radicals, the bromine atoms consisting of at least 45 percent by weight of the organic compound, and from 2 percent to 10 percent of an antimony compound selected from the group consisting of $SbCl_3$, $SbBr_3$, $SbI_3$, $SbOCl$, $Sb_2S_3$, and mixtures thereof.

16. A self-extinguishing rigid cellular material comprising by weight, 100 parts of a polyurethane resin obtainable by reacting a polyisocyanate and a compound containing active hydrogen as determined by Zerewitinoff test, as the sole self-extinguishing composition, a synergistic composition consisting of about 10 parts of tris (2,3-dibromopropyl) phosphate and about 5 parts of antimonous chloride.

17. A composition of matter consisting of from 5 to 20 parts by weight of an organic bromine compound having a plurality of bromine atoms attached to carbon atoms of a radical selected from the group consisting of cyclohexyl and aliphatic radicals, the bromine atoms constituting at least 45 percent by weight of the organic compound and from 2 to 10 parts by weight of an antimony compound selected from the group consisting of $SbCl_3$, $SbBr_3$, $SbI_3$, $SbOCl$, $Sb_2S_3$, and mixtures thereof.

18. A composition consisting of about 10 parts by weight of tris(2,3-dibromopropyl) phosphate and about 5 parts by weight of antimonous chloride.

19. A self-extinguishing rigid cellular material comprising by weight, 100 parts of a polyurethane resin obtainable by reacting a polyisocyanate and a compound containing active hydrogen as determined by the Zerewitinoff test, about parts of 1,2,3,4,5-pentabromo-6-chlorocyclohexane and about 5 parts of antimous chloride.

20. A composition comprising about 10 parts by weight of 1,2,3,4-5-pentabromo-6-chlorocyclohexane and about 5 parts by weight of antimonous chloride.

21. A composition of matter comprising a polyurethane resin obtainable by reacting a polyisocyanate and a compound containing active hydrogen as determined by the Zerewitinoff test containing intimately admixed therewith, as the sole self-extinguishing composition, a synergistic composition consisting of from 5 to 20 percent by weight based on the weight of the resin of an organic bromine compound having a plurality of bromine atoms attached to the carbon atoms of a radical selected from the group consisting of cyclohexyl and aliphatic radicals, the bromine atoms constituting at least 45 percent by weight of the compound, and from 2 to 10 percent by weight based on the weight of the resin of an antimony compound selected from the group consisting of $SbCl_3$, $SbBr_3$, $SbI_3$, $SbOCl$, $Sb_2S_3$ and mixtures thereof.

22. A composition according to claim 21 in which the organic bromine compound is tris(2,3-dibromopropyl) phosphate.

23. A composition according to claim 21 in which the organic bromine compound is 1,2,3,4-tetrabromobutane.

24. A composition according to claim 21 in which the organic bromine compound is acetylene tetrabromide.

25. A composition according to claim 21 in which the antimony compound is $SbCl_3$.

26. A composition according to claim 21 in which the antimony compound is $SbBr_3$.

27. A composition according to claim 21 in which the antimony compound is $SbOCl$.

28. A composition of matter comprising a polyurethane resin obtainable by reacting a polyisocyanate and a compound containing active hydrogen as determined by the Zerewitinoff test containing intimately admixed therewith from 2 to 30 percent based on the weight of the resin of 1,2,3,4,5-pentabromo-6-chlorocyclohexane and from 1 to 15 percent based on the weight of the resin of an antimony compound selected from the group consisting of $SbCl_3$, $SbBr_3$, $SbI_3$, $SbOCl$, $Sb_2S_3$ and mixtures thereof.

29. A self-extinguishing foam comprising a normally flammable polyurethane resin obtainable by reacting a polyisocyanate and a compound containing active hydrogen as determined by the Zerewitinoff test in intimate admixture with from 1 to 15 percent based on the weight of the resin of an antimony compound selected from the group consisting of $SbCl_3$, $SbBr_3$, $SbI_3$, $SbOCl$, $Sb_2S_3$ and mixtures thereof, and from 2 to 30 percent based on the weight of the resein of 1,2,3,4-5-pentabromo-6-chlorocyclohexane.

30. A composition of matter comprising a polyurethane resin obtainable by reacting a polyisocyanate and a compound containing active hydrogen as determined by the Zerewitinoff test containing intimately admixed therewith from 5 to 20 percent by weight based on the weight of the resin of 1,2,3,4,5-pentabromo-6-chlorocyclohexane and from 2 to 10 percent by weight based on the weight of the resin of an antimony compound selected from the group consisting of $SbCl_3$, $SbBr_3$, $SbI_3$, $SbOCl$, $Sb_2S_3$ and mixtures thereof.

References Cited by the Examiner

UNITED STATES PATENTS

| | | | |
|---|---|---|---|
| 2,577,281 | 12/1951 | Simon et al. | 260—2.5 |
| 2,658,877 | 11/1953 | Dreisbach et al. | |
| 3,004,935 | 10/1961 | Raley et al. | 260—45.7 |
| 3,039,991 | 6/1962 | Cooper | 260—2.5 XR |

FOREIGN PATENTS

| | | |
|---|---|---|
| 514,329 | 7/1955 | Canada. |
| 810,551 | 3/1959 | Great Britain. |

OTHER REFERENCES

Emschwiller et al. bull. Soc. Chim. (France), 1949, pp. 118–121.

Merck Index, sixth ed., Merck and Co., Inc., Rahway, N.J. (1952), p. 89.

LEON J. BERCOVITZ, *Primary Examiner.*

DANIEL ARNOLD, *Examiner.*

R. C. STEWART, D. ECZAJA, *Assistant Examiners.*